March 16, 1926.
N. A. REISCH
1,576,931
MILK COOLER
Filed April 30, 1925
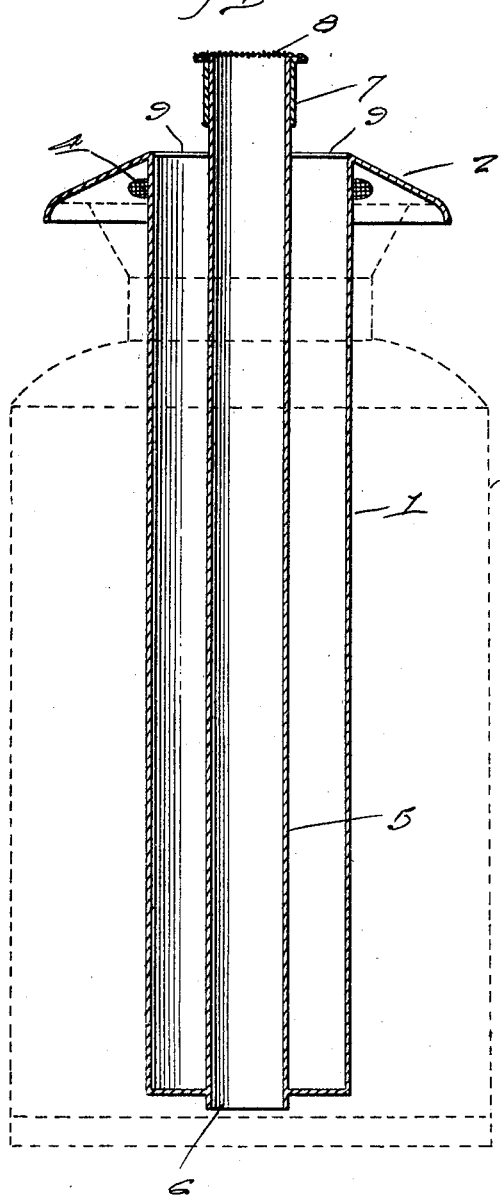
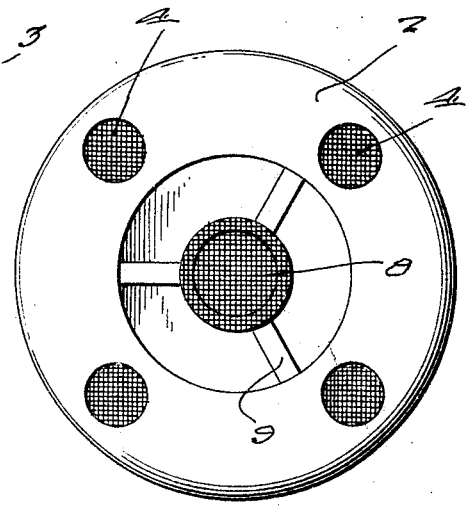
Inventor
N. A. Reisch Patented Mar. 16, 1926.

1,576,931

UNITED STATES PATENT OFFICE.

NICKOLAS A. REISCH, OF LE MARS, IOWA.

MILK COOLER.

Application filed April 30, 1925. Serial No. 27,101.

*To all whom it may concern:*

Be it known that I, NICKOLAS A. REISCH, a citizen of the United States, residing at Le Mars, in the county of Plymouth and State of Iowa, have invented certain new and useful Improvements in Milk Coolers, of which the following is a specification.

This invention relates to an improved milk cooler, that is, to a device, which is adapted to be placed upon and in a milk can for aerating the milk therein.

My primary aim is to generally improve upon devices of this class by providing one of comparative simplicity and durability, which serves to effectively aerate the milk and to relieve it of the animal heat, by affording passages for escape of the heat, together with means for effectively covering the open top of the can so as to prevent the entrance of dirt and extraneous particles.

An equally important advantage is to provide a cylinder which is adapted to fit down into the can, this cylinder being adapted to contain a cooling medium, such as cold water and the like, to render the cooling action as rapid as is possible, with a device of this kind.

Other features and advantages of the invention will become apparent from the following description and drawings.

In the accompanying drawings, forming a part of this application, and in which like numerals are employed to designate like parts throughout the same:

Figure 1 is a central vertical section through a milk cooler constructed in accordance with the present invention, showing the method of using the same.

Figure 2 is a top plan view of the same.

Referring to the drawing in detail, the reference character 1 designates vertically elongated cylinder, which is closed at its bottom and open at its top to provide a container for reception of cold water. Formed integral with the top of this cylinder is an annular flange 2, which is inclined downwardly and has its marginal edge shaped as shown to permit it to overlie the usual neck of the milk can 3. This flange is thus permitted to function as a cover during the period of use of the device and to prevent entrance of dirt and extraneous particles.

It will be observed that the flange is provided with circumferentially spaced screened openings 4 to permit passage of upwardly rising warm air therethrough for relieving the milk of the animal heat which it contains. Disposed concentrically within the cylinder is a vertically elongated hollow tube 5, the lower end 6 of which extends through an opening in the bottom of the cylinder. The upper end of this tube projects above the open top of the cylinder and a sleeve 7 is fitted thereon and carries a screen 8. Although it is not essential, reinforcing spider arms 9 may be provided between the tube and cylinder to secure rigidity of construction.

In practice, the device is fitted into the milk can in the manner shown in the drawing, at which time the flange 2 constitutes a cover for the open end of the can. The cylinder 1 is filled with cold water and thus to cool the milk which rises in the tube 5 and the surrounding milk in the can. The heat waves from the milk rise upwardly through the screened openings 4 and the screen 8, thus relieving the milk of the animal heat which it contains and particularly just after the milking operation has been completed. These screened openings also allow passage of air for cooling purposes. It is thus obvious that I have evolved and produced a novel, simple, and inexpensive milk cooling device, which may be used to advantage before the milk is bottled or the cream separated from the same. It is thought that persons familiar with inventions of this class will be able to obtain a clear understanding of the same after considering the description, in connection with the drawings. Therefore a more lengthy description is thought unnecessary.

While the preferred embodiment of the invention has been shown and described, it is to be understood that minor changes coming within the field of invention claimed may be resorted to, if desired.

I claim:

In a milk cooler of the class described, a cylindrical receptacle closed at its bottom and provided at its top with a marginal outstanding flange shaped to form a cover for the open top of a milk can, said flange being formed with screened openings, an open ended hollow tube disposed concentrically within said receptacle and having its lower end extending through the bottom of the receptacle and terminating a distance therebelow and having its upper end extending above the upper end of the receptacle, and provided with a screened closure, spider arms radiating from the upper intermediate portion of the tube and fixed at their outer ends to the upper edge of the receptacle.

In testimony whereof I affix my signature.

NICKOLAS A. REISCH.